United States Patent [19]

Nigol et al.

[11] 4,362,901
[45] Dec. 7, 1982

[54] BELLOWS-TYPE VIBRATION ABSORBER FOR SUSPENDED CABLES AND SUSPENDED CABLE IN COMBINATION THEREWITH

[75] Inventors: Olaf Nigol, Etobicoke; Herbert J. Houston, Oakville, both of Canada

[73] Assignee: Slater Steel Industries Limited, Hamilton, Canada

[21] Appl. No.: 300,926

[22] Filed: Sep. 10, 1981

Related U.S. Application Data

[63] Continuation-in-part of Ser. No. 249,425, Mar. 31, 1981, abandoned.

[51] Int. Cl.³ .................... H02G 7/14; H02G 7/12
[52] U.S. Cl. .................................. 174/42; 174/146
[58] Field of Search ............................. 174/42, 146

[56] References Cited

U.S. PATENT DOCUMENTS 3,885,086  5/1975  Houston et al. .................. 174/42

Primary Examiner—Laramie E. Askin
Attorney, Agent, or Firm—Burgess, Ryan and Wayne

[57] ABSTRACT

A vibration absorber for attachment to suspended cables such as electrical transmission lines, to suppress vertical aeolian vibrations as well as horizontal subconductor oscillations. A clamp arm has one end attached to a suspended cable and a fulcrum adjacent the other end. The fulcrum is rotatably coupled to a frame, and the end of the clamp arm adjacent the fulcrum is coupled to the frame through two bellows elements which force air through small orifices to provide viscous friction when the clamp arm is caused to rotate relative to the frame as a result of said vibrations or oscillations. Each bellows includes a resilient pleated portion which acts to restore the initial orientation of the clamp arm.

12 Claims, 2 Drawing Figures

BELLOWS-TYPE VIBRATION ABSORBER FOR SUSPENDED CABLES AND SUSPENDED CABLE IN COMBINATION THEREWITH

This application is a continuation-in-part of application Ser. No. 249,425, filed Mar. 31, 1981, now abandoned, and assigned to the assignee of the instant application.

BACKGROUND OF THE INVENTION

This application is directed to an improved vibration absorber for suspended cables including but not limited to electrical transmission lines; and more specifically to a device for absorbing energy to suppress mechanical subspan oscillation and aeolian vibration of such cables.

The vibration absorber herein described operates on the principles disclosed in co-pending U.S. Patent Application Ser. No. 147,096, filed May 7, 1980, assigned to the assignee of the present application and entitled "SUBSPAN OSCILLATION AND AEOLIAN VIBRATION ABSORBER FOR SINGLE AND BUNDLE CONDUCTORS". This prior application discloses and claims an essentially dissipative (as opposed to spring-type) vibration absorber, having a damping mechanical impedance which essentially matches the mechanical impedance of the transmission line to which the damper is attached. The acceptable range of damper impedance of the absorber is indicated as being anywhere between half and three times the transmission line mechanical impedance.

By essentially matching the transmission line mechanical impedance, and providing a dissipative (i.e., frequency independent) damping effect, the vibration absorber of the aforesaid U.S. Patent Application Ser. No. 147,096 provides optimum energy coupling between the transmission line and absorber, thus effectively absorbing travelling waves on the line before they build up to large amplitude standing waves which can cause damage to the line and associated supporting elements.

Until the aforesaid invention was made, prior art spring-type dampers had to be designed so that they operated effectively over the resonant frequency range of the transmission line to be damped. These dampers had to also be situated at points on the transmission line where standing waves would be of relatively large amplitude, i.e., at distances of a quarter wavelength from adjacent nodes.

The invention of U.S. Patent Application Ser. No. 147,096 relates to the use of vibration absorbers which can be connected to transmission lines to provide essentially dissipative damping. That is, these dampers utilize viscous-type effects, so that damping is essentially frequency independent. In contradistinction, those prior art dampers which utilized springs had undesirable resonance characteristics. A typical prior art vibration damper of this type is shown in U.S. Pat. No. 3,885,086. The vibration damper shown in this patent, however, is unsuitable for use in the arrangement contemplated by the aforementioned U.S. Patent Application Ser. No. 147,096, because it is incapable of providing the critical dissipative damping required. In U.S. Pat. No. 3,885,086, the annular washers 12 are situated between clamp arms 16 and adjacent frame portions 10, and secured thereto so that said washers do not rotate. The washers are of a resilient material, so that rotation of the clamp arm 16 results in deformation of the washers, the resilient characteristics of which then return the clamp arms to their initial orientations. In this arrangement, the only dissipative damping effects are provided by hysteresis losses within the resilient washers. Any attempt to increase the hysteresis losses by increasing the size of the washers, results in the spring force of the washers rising substantially faster than their hysteresis losses, making such a design impractical. Further, limitations of the resilient material itself make it impracticable to obtain sufficiently great hysteresis losses to provide critical dissipative damping. In addition, the hysteresis losses in the washers 12 are dependent upon both frequency and amplitude of vibration.

In contradistinction, dampers of U.S. Patent Application Ser. No. 147,096, being dissipative and therefore frequency-independent, need not be concerned with the resonant frequencies of the transmission line to which they are to be attached. Further, such dampers, being essentially impedance matched (i.e., within a range of half to three times the characteristic impedance of the transmission line to which they are to be attached), absorb travelling waves, so that they can be placed at any desired place on the transmission line to be damped.

Thus, there remains a need for an improved vibration absorber capable of being utilized according to the aforementioned principles.

Two types of improved vibration absorbers are described in U.S. Patent Application Ser. No. 216,870, filed Dec. 16, 1980 (now abandoned in favor of continuation-in-part application Ser. No. 300,751, filed Sept. 10, 1981) and U.S. Patent Application Ser. No. 249,488 filed Mar. 31, 1981 (now abandoned in favor of continuation-in-part application Ser. No. 300,752, filed Sept. 10, 1981), all of said applications being assigned to the assignee of the instant application.

Accordingly, an object of the present invention is to provide an improved vibration absorber in which the damping effect produced is essentially dissipative and therefore frequency-independent, and wherein the damping impedance is adjustable to a value capable of essentially matching the mechanical characteristic impedance of the cable to which the vibration absorber is connected.

SUMMARY

As herein described, there is provided a bellows-type vibration absorber for suspended cables, comprising a frame; a clamp body having a first portion for engaging a cable in a predetermined position and a second portion, including (i) a fulcrum part rotatably mounted to said frame for rotation of said clamp body about an axis generally parallel to said predetermined position of said cable, and (ii) a damping means engaging part adjacent said fulcrum part; orifice means; bellows means coupled between said damping means engaging part of said clamp body and said frame for forcing air through said orifice means to produce viscous frictional losses in response to rotational movement of said clamp body about said axis; resilient means coupled to said frame for restoring said clamp arm to an initial angular orientation thereof with respect to said frame; and means for varying said viscous frictional losses, so that said viscous frictional losses provide essentially dissipative damping for both said cable and said resilient means.

IN THE DRAWING

FIG. 1 is a front elevation view of a bellows-type vibration absorber according to a preferred embodiment of the invention; and FIG. 2 is an exploded perspective view of the left hand portion of said vibration absorber.

DETAILED DESCRIPTION

Figure 1:
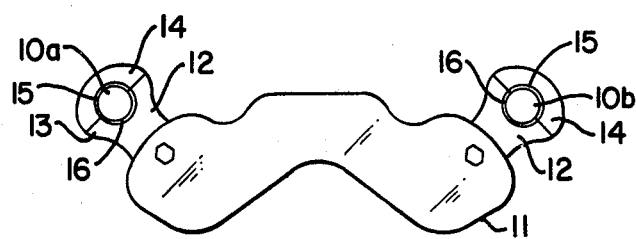
Figure 2:
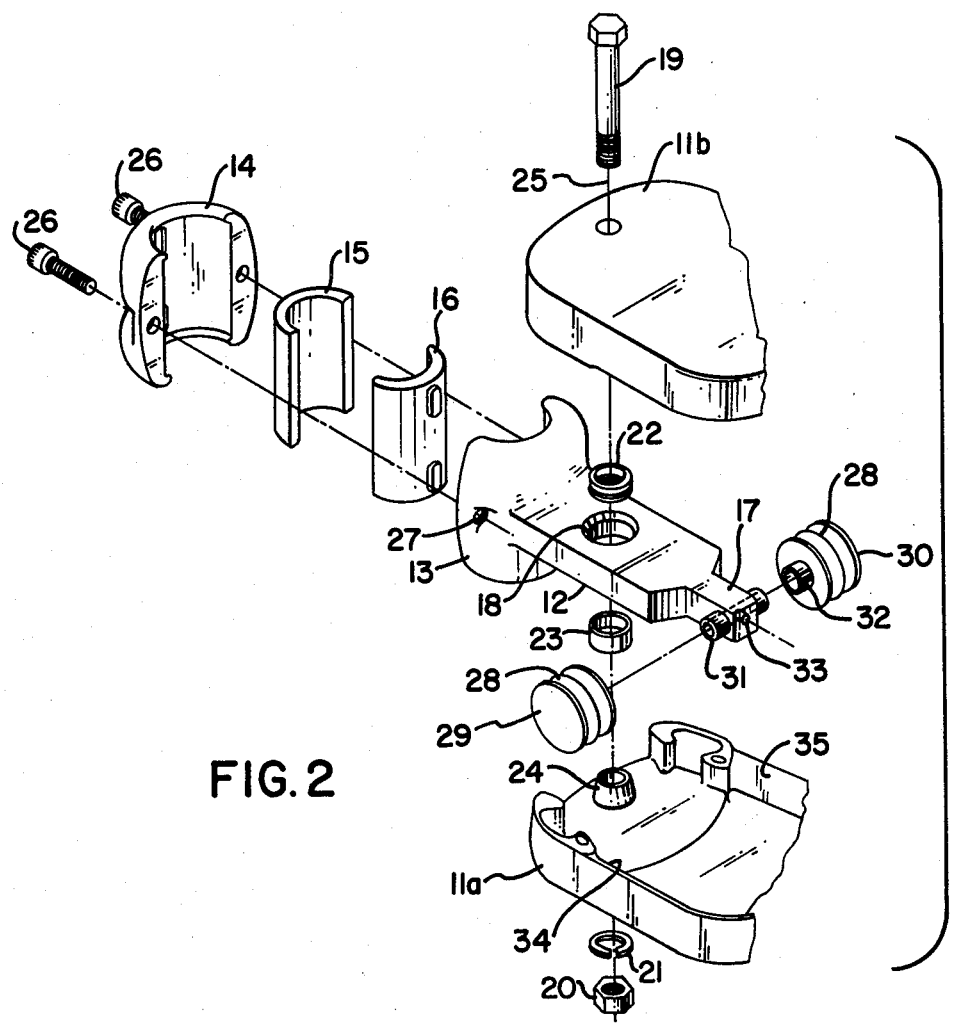

Aeolian vibration and sub-conductor oscillation derive their excitation from the minute forces associated with the release of vortices on the leeward side of conductors and cables when they are subjected to a steady air flow across their surfaces. It is believed that the excitation of aeolian vibration is derived from the detachment of the vortices and that sub-conductor oscillation is derived from the flow of the released vortices past the leeward conductor.

This release of vortices produces travelling waves which proceed along the span in opposite directions from their origin towards the suspension points. These waves in turn release other vortices to reinforce and amplify the wave motion. When the travelling wave arrives at the suspension point of the conductor, that is the attachment point of the conductor to the supporting structure, it is reflected with a 180° phase reversal due to the rigidity of the support point. The damping characteristics of the conductor and the suspension hardware are very small, so that attenuation of the travelling waves is also very small. This allows the travelling wave to make a large number of passes in a given span to thereby generate a standing wave having an amplitude of constant value, the amplitude being determined by the total damping of the system.

The aforementioned vibration phenomena may be avoided by preventing the formation of a standing wave rather than attempting to control the amplitude of the standing wave. Since it is not feasible to prevent vortex detachment, the present invention provides an absorber which will absorb the travelling wave and prevent its reflection back along the conductor. This is achieved by matching the dissipative impedance of the absorber with the characteristic mechanical impedance of the conductor.

The characteristic mechanical impedance of a conductor is defined as the ratio of force and velocity amplitudes of the travelling waves. Since the mechanical impedance of the conductor is a function of the tension in the conductor and the mass of the conductor per unit length, an absorber can be designed to match the mechanical impedance of the conductor for any given installation. Further, because the use of a dissipative damper for absorbing the wave does not require a frequency dependent resilient system, the absorber may be placed at any convenient location along the span of the conductor and not, as previously described, just at $\lambda/4$ wavepoints of the center aeolian frequency of the conductor.

Under ideal conditions where the absorber is installed at any point on the conductor, the absorber impedance R should be $k\sqrt{Tm}$, where T is the tension of the conductor, m is the mass of the conductor per unit length, and k is the damping factor which, under the aforementioned ideal conditions, equals 2.0 to reflect the fact that the conductor extends in both directions from the absorber. It has been found that significant improvements in vibration control may be achieved by selecting an absorber impedance or damping factor in the range of $0.5\sqrt{Tm}$ to $3\sqrt{Tm}$. Thus, increases in T and m due to icing of the conductors will not unduly affect the operation of the absorber.

This principle may be applied to sub-conductor oscillation by utilizing the intertial mass of other bundle conductors to provide support for the damping member. Thus, by arranging a rotary action type vibration absorber at an angle of 45° or at least in the range of 30° to 60° from the vertical and horizontal planes, it will absorb the travelling waves associated with the build-up of both vertical aeolian vibration and horizontal sub-conductor oscillation.

A spacer damper type vibration absorber which operates in the aforementioned manner, viz., by interconnection between two adjacent cables or bundle conductors 10a and 10b, is illustrated in FIG. 1 of the drawing. This spacer damper comprises a frame 11 having two opposed spaced-apart portions 11a and 11b.

A clamp arm 12 has an end portion 13 for engaging the cable 10a, via clamp keeper 14 and elastomeric inserts 15 and 16. Another clamp arm 12 at the opposite end of the frame 11 similarly has an end portion for engaging cable 10b.

To avoid confusion, further discussion will be confined to only one end of the frame 11 and its associated clamp arm 12.

Adjacent the end 17 of the clamp arm 12 remote from the cable 10a is a fulcrum 18 which is rotatably mounted to the frame 11 by means of a bolt 19, secured in position by a nut 20 and a lock washer 21.

Rotational friction and wear are minimized by spherical bearing 22 disposed within sleeve 23 which abuts frame boss 24.

The end portion 13 of the clamp arm 12 has a longitudinal groove for receiving the cable 10a in a predetermined orientation generally parallel to the rotational axis 25 of the clamp arm 12 as defined by the longitudinal axis of the bolt 19. The clamp keeper 14 cooperates with the clamp arm 12 (via inserts 15 and 16) to retain the cable 10a in position, the clamp keeper 14 being urged toward the clamp arm 12 by means of bolts 26 and threaded holes 27 in the end 13 of the clamp body 12.

Rotation of the clamp arm 12 with respect to the frame 11 is resisted by resilient or elastomeric wall or diaphragm pleated portions 28 of bellows units 29 and 30, which act to restore the clamp arm 12 to its initial or "neutral" position with respect to the frame 11 after the clamp arm 12 has been deflected by aeolian vibration or sub-conductor oscillation forces.

Dissipative energy losses occur primarily as a result of viscous friction resulting from the forcing of air through the controlled orifices 31 and 32 (and common vent hole 33) by compression and expansion of the respective bellows units 29 and 30, as they are operated by movement of the clamp body end part 17 toward and away from the frame walls 34 and 35, as a result of rotation of the clamp body 12 about the axis 25. Losses due to hysteresis in the diaphragms 28 and 29 are relatively small in comparison with the viscous frictional losses.

The amount of frictional force or loss, i.e., the dissipative damping factor of the spacer damper, may be adjusted by varying the sizes of the orifices 31 and 32 and/or of the vent hole 33, by drilling the same out or by substituting various inserts of different orifice size therefor. In the latter case, orifices are preferably provided as predrilled threaded inserts.

By appropriately selecting the orifice vent hole sizes, dissipative damping factors in the aforementioned desired range of $0.5\sqrt{Tm}$ to $3.0\sqrt{Tm}$ can be obtained.

As best seen in FIG. 1, for equal response to vertical aeolian vibrations and horizontal sub-conductor oscillations, the spacer-damper should be constructed and positioned such that a line normal to and intersecting the axis of rotation of the clamp arm 12 about the frame 11 and a cable, makes an angle of 45°, with respect to the horizontal. For a particular application where enhanced response to either vertical or horizontal movement of the cable is desired, the aforementioned angle can be varied in the range of 30° to 60°.

With the aforementioned arrangement, the viscous friction produced by the bellows units via orifices 31 and 32 and common vent hole 33, provides damping not only for the vibrations and oscillations of the cable, but also for the resilient diaphragms 28 and 29.

The spacer damper described above may be installed on an electrical transmission line in a non-linear spacing system, i.e., with the distance between adjacent conductors connected by spacer-damper units being different between adjacent spans of the suspended cables, so that any two adjacent spans would have a different response frequency to sub-conductor oscillation. The spacer-dampers act as gates under these conditions, dumping energy from the responding sub-span into the adjacent spans. Because of the different response frequencies of the adjacent spans, efficient energy absorption is thus attained.

What is claimed is:

1. A bellows-type vibration absorber for suspended cables comprising:
   a frame having two opposed portions, said portions cooperating to provide first and second spaced parallel side walls;
   a shaft extending between said portions;
   a clamp body having a first portion for engaging a cable in a predetermined position and a second portion including (i) a fulcrum part rotatably mounted to said shaft for rotation of said clamp body about an axis generally parallel to a predetermined position of a cable, and (ii) an end part adjacent said fulcrum part on the side thereof remote from said first portion;
   orifice means;
   a first bellows coupled between said end part of said clamp body and said first side wall for forcing air through said orifice means to produce viscous frictional losses in response to rotational movement of said clamp body about said axis;
   a second bellows coupled between said end part of said clamp body and said second side wall for forcing air through said orifice means to produce viscous frictional losses in response to rotational movement of said clamp body about said axis;
   each of said bellows having a resilient part for restoring said clamp body to an initial angular orientation thereof with respect to said frame; and
   means for adjusting said orifice means to vary said viscous frictional losses, said losses substantially exceeding any hysteresis losses within said vibration absorber, so that said viscous frictional losses provide dissipative damping for both a cable and said resilient parts of said bellows.

2. The vibration absorber according to claim 1, wherein said orifice means comprises at least one hole in said end part of said clamp body.

3. The vibration absorber according to claim 2, wherein said hole provides a common orifice for said first and second bellows.

4. The vibration absorber according to claim 1, wherein said first and second bellows are mutually coaxial.

5. The vibration absorber according to claim 4, wherein the axis of said bellows is orthogonal to the axis of rotation of said clamp body.

6. A bellows-type vibration absorber for suspended cables, comprising:
   a frame;
   a clamp body having a first portion for engaging a cable in a predetermined position and a second portion including (i) a fulcrum part rotatably mounted to said frame for rotation of said clamp body about an axis generally parallel to a predetermined position of a cable, and (ii) a damping means engaging part adjacent said fulcrum part;
   orifice means;
   bellows means coupled between said damping means engaging part of said clamp body and said frame for forcing air through said orifice means to produce viscous frictional losses in response to rotational movement of said clamp body about said axis;
   resilient means coupled to said frame for restoring said clamp body to an initial angular orientation thereof with respect to said frame; and
   means for varying said viscous frictional losses so that said viscous frictional losses provide essentially dissipative damping for both a cable and said resilient means.

7. A bellows-type vibration absorber according to claim 6, wherein said means for varying said losses comprises means for adjusting said orifice means.

8. A bellows-type vibration absorber for suspended cables, comprising:
   a frame having spaced frame elements;
   a shaft supported by said frame;
   a clamp body having a first portion for engaging a cable in a predetermined position and a second portion including (i) a fulcrum part rotatably mounted to said shaft for rotation of said clamp body about an axis generally parallel to a predetermined position of a cable, and (ii) a damping means engaging part adjacent said fulcrum part;
   orifice means; and
   at least one bellows coupled between said damping means engaging part of said clamp body and at least one of said frame elements for forcing air through said orifice means to produce viscous frictional losses in response to rotational movement of said clamp body about said axis,
   said bellows having a resilient part for restoring said clamp body to an initial angular orientation thereof with respect to said frame.

9. A bellows-type vibration absorber according to claim 8, further comprising means for adjusting said orifice means to vary said viscous frictional losses, so that said viscous frictional losses provide dissipative damping for both a cable and said resilient part of said bellows.

10. In combination,
    a suspended cable having a mechanical characteristic impedance given by $\sqrt{Tm}$, where T is the cable tension and m is the cable mass per unit length; and
    a bellows-type vibration absorber for said suspended cable, comprising:

a frame having two opposed portions, said portions cooperating to provide first and second spaced parallel side walls;

a shaft extending between said portions;

a clamp body having a first portion engaging said cable in a predetermined position and a second portion including (i) a fulcrum part rotatably mounted to said shaft for rotation of said clamp body about an axis generally parallel to said predetermined position of said cable, and (ii) an end part adjacent said fulcrum part on the side thereof remote from said first portion;

orifice means;

a first bellows coupled between said end part of said clamp body and said first side wall for forcing air through said orifice means to produce viscous frictional losses in response to rotational movement of said clamp body about said axis;

a second bellows coupled between said end part of said clamp body and said second side wall for forcing air through said orifice means to produce viscous frictional losses in response to rotational movement of said clamp body about said axis;

each of said bellows having a resilient part for restoring said clamp body to an initial angular orientation thereof with respect to said frame; and means for adjusting said orifice means to vary said viscous frictional losses, said losses substantially exceeding any hysteresis losses within said vibration absorber, so that said viscous frictional losses provide dissipative damping for both said cable and said resilient parts of said bellows, with a damping factor equal to $k\sqrt{Tm}$, where $0.5 \leq k \leq 3$.

11. In combination, a suspended cable having a mechanical characteristic impedance given by $\sqrt{Tm}$, where T is the cable tension and m is the cable mass per unit length; and a bellows-type vibration absorber for said suspended cable, comprising:

a frame having spaced frame elements;

a shaft supported by said frame;

a clamp body having a first portion engaging said cable in a predetermined position and a second portion including (i) a fulcrum part rotatably mounted to said shaft for rotation of said clamp body about an axis generally parallel to said predetermined position of said cable, and (ii) a damping means engaging part adjacent said fulcrum part;

orifice means; and at least one bellows coupled between said damping means engaging part of said clamp body and at least one of said frame elements for forcing air through said orifice means to produce viscous frictional losses in response to rotational movement of said clamp body about said axis;

said bellows having a resilient part for restoring said clamp body to an initial angular orientation thereof with respect to said frame; and means for adjusting said orifice means to vary said viscous frictional losses, so that said viscous frictional losses provide dissipative damping for both said cable and said resilient part, with a damping factor equal to $k\sqrt{Tm}$, where $0.5 \leq k \leq 3$.

12. In combination, a suspended cable having a mechanical characteristic impedance given by $\sqrt{Tm}$, where T is the cable tension and m is the cable mass per unit length; and a bellows-type vibration absorber for said suspended cable, comprising:

a frame;

a clamp body having a first portion engaging said cable in a predetermined position and a second portion including (i) a fulcrum part rotatably mounted to said frame for rotation of said clamp body about an axis generally parallel to said predetermined position of said cable, and (ii) a damping means engaging part adjacent said fulcrum part;

orifice means;

bellows means coupled between said damping means engaging part of said clamp body and said frame for forcing air through said orifice means to produce viscous frictional losses in response to rotational movement of said clamp body about said axis;

resilient means coupled to said frame for restoring said clamp body to an initial angular orientation thereof with respect to said frame; and means for adjusting said viscous frictional losses to provide dissipative damping for both said cable and said resilient means, with a damping factor equal to $k\sqrt{Tm}$, where $0.5 \leq k \leq 3$.

* * * * *